(12) United States Patent
Scanlan

(10) Patent No.: US 6,186,763 B1
(45) Date of Patent: Feb. 13, 2001

(54) THREADED ACTUATOR FOR POSITIONING STRUCTURE SUBJECTED TO INTENSE LOADS

(75) Inventor: Mark R. Scanlan, Hartford, WI (US)

(73) Assignee: PFA Incorporated, Germantown, WI (US)

( * ) Notice: Under 35 U.S.C. 154(b), the term of this patent shall be extended for 0 days.

(21) Appl. No.: 09/211,536

(22) Filed: Dec. 15, 1998

(51) Int. Cl.[7] .................................................. B28B 17/00
(52) U.S. Cl. ...................... 425/195; 425/330; 425/451.2; 425/468
(58) Field of Search .................... 425/193, 195, 425/330, 450.1, 451.2, 468, 577, 589, 590, DIG. 10

(56) References Cited

U.S. PATENT DOCUMENTS 4,842,508 * 6/1989 Boskovic .............................. 425/468
4,869,659 * 9/1989 Sakai et al. ........................... 425/135

* cited by examiner

Primary Examiner—Harold Pyon
Assistant Examiner—Emmanuel S. Luk
(74) Attorney, Agent, or Firm—Andrus, Sceales, Starke & Sawall

(57) ABSTRACT

A threaded actuator is disclosed for positioning a core in a molding apparatus. The threaded actuator includes a hydraulic cylinder unit having a piston rod connected to the core for positioning thereof. The core is subjected to intense force during the molding process and this force is transmitted onto the piston rod and hydraulic cylinder unit and its support. The hydraulic cylinder has a threaded nose which is secured within a threaded opening in a support. A rotatable threaded connecting member is threaded between the threaded nose and the threaded opening of the support structure. The outer and inner threaded connections of the rotatable threaded connecting member are of different thread configurations to form a differential thread assembly. The configurations may differ either in pitch and/or in the handedness of the threads. The differential threaded assembly provides for relative positioning of the hydraulic cylinder unit and core relative to the mold. A preload system includes a wall on the cylinder and a wall on the rod for preloading of the locked rod and the supporting components. The hydraulic cylinder and the piston rod are formed with stop wall members which provide for controlled extension of the piston rod for preloading of the piston rod and the supporting structure. A locking unit provides for locking of the rod in an extended position.

19 Claims, 10 Drawing Sheets

THREADED ACTUATOR FOR POSITIONING STRUCTURE SUBJECTED TO INTENSE LOADS

BACKGROUND OF THE INVENTION

The present invention is directed to a threaded actuator for positioning a structure subjected to intense loads and forces, and particularly a motor driven extendible member positioned to receive and support an intense load.

In various systems, an extendible member is accurately located between a rest position and an operative position. In the operative position, an intense force and load may be placed on the member. A typical application developed by the assignee of the present invention relates to injection mold and die casting systems in which a core of a mold body is positioned between an opened and closed position. For example, in a side-action system for molding and casting apparatus, one or more cores are slidably mounted with respect to each other within the mold body to open and close the mold. Each movable core is similarly mounted within a slide cavity and coupled to a threaded actuator secured to the mold base. The threaded actuator includes an hydraulic cylinder unit including a threaded nose or portion from which the piston rod extends. The core slide is secured to the end of the rod and slidably mounted within the mold body. The threaded nose of the cylinder is positioned within a threaded flange secured to the base for accurate positioning of the cylinder and thereby the rod, slide and core with respect to its position by full or near extension of the cylinder unit. The cylinder unit is specially constructed with a high force locking system between the rod and cylinder such that with the core appropriately located, the core is held in place with an intense force often greater than the cylinder motive force and under a pre-loaded condition as a result of interconnection between the core slide and the mold body. Thus, the system is arranged with internal mating parts which develop a very large mechanical advantage in establishing high preload forces where desired or necessary.

The above system has been found to establish high quality parts having essentially zero flash and with minimal wear and maintenance costs in the side-action positioning to produce a highly cost effective system for molding and die casting when compared to other available system using toggle linkages, cam pins, heel blocks or other means for positioning of the cores. The system operation is dependent upon the accurate positioning of the threaded actuator and also in establishing high preloading on the supporting rod structure. Thus, although very rigid members are used for supporting of a core and in the core as such, it cannot be assumed under all conditions and particularly large intense forces, that even the large preload does not positively insure against some compression of the supporting structure during a molding cycle in the presence of the intense loading.

Although the threaded actuator has been operated very successfully in side action molding and die casting apparatus, accurate set up is required to establish the desired initial positioning of the threaded actuator as well as establishing and maintaining the desired preload on the slide system for each particular molding sequence or part formation. Recognizing that both of these factors are of significance in providing optimal constructions, continuous consideration for desired improvement in the positioning system is desirable in maintaining the high quality in the side-action systems.

The same desire for accurate positioning of motor-driven threaded actuators may of course arise in other applications and the present invention with its improvements can be readily applied to other motor-driven applications. The above described system includes a hydraulic cylinder as the motor means. In molds or other systems, motors may be used such as pneumatic, electric and mechanical motor devices including an extendible work member and a threaded connecting portion for positioning of the work member.

SUMMARY OF THE PRESENT INVENTION

The present invention is particularly directed to a motor-driven threaded actuator and particularly to the mounting of the threaded actuator within a threaded support structure and more particularly in a mold system the mounting of a threaded cylinder or other motor unit to the support structure in a high pressure mold apparatus.

In accordance with the present invention, a threaded portion of a motor is connected to a support structure using a special differential thread assembly permitting the final positioning thereof without rotation of the motor. Generally, in accordance with the present invention, the threaded motor and threaded support structure include radially spaced threaded portions, with the motor threaded portion and the support threaded portion having different threads. A connecting threaded member is threaded into the assembly with threads corresponding with inner and outer threads corresponding to the threads of the motor and the threads of the support structure respectfully to form a differential threaded connection. The differential threaded connection may include a pitch difference, a handedness difference or a combination thereof. In assembly, the actuator can be initially mounted and threaded into the threaded connecting member. After the initial positioning of the assembly, turning of the differential connecting member provides fine adjustment of the motor assembly relative to the support structure. A securing device is preferably provided to lock the assembly in the set position, such as a jam member threaded onto the motor and engaging the support structure, to maintain the final adjusted position.

The differential threaded connection permits a very fine adjustment as the rotation of the connecting member will of course provide an axial shift of the motor unit equal to the difference between the motor thread connection and the support thread connection.

In a side action mold system which includes a threaded hydraulic cylinder unit, the very accurate positioning of the cylinder unit permits a precise final movement of the motor unit. In the mold system, it is used for accurate location of the interconnected core, with the same positioning of the core during successive formation of like parts.

In an optimal construction, the connecting threaded member is formed of a sufficient length to allow the member to shift with the cylinder unit while maintaining operative engagement with the support structure. A securing device threaded onto the cylinder and abutting the structure is constructed to permit such necessary desired movement of the connecting threaded member during the inner and outward positioning of the cylinder unit. The differential thread arrangement eliminates any problems which can arise in some applications of threaded actuators by permitting a standard hydraulic cylinder unit maintained in an appropriate desired location prior to final adjustment. Thus, the connection is not subjected to any rotating forces and at most requires simple linear displacement which can normally be readily established without rotational displacement of the several mechanical, hydraulic and/or electrical connections or the like to the threaded actuator. This feature of course is not present with prior mounting of the cylinder unit.

In this application, designing of the respective thread sets in an opposite handedness allow the reverse movement at any given particular rotation of the control adjustment element. The direction of the threads can also be mixed. For example, if one thread is righthanded and the other left-handed, the result would be an addition to a pitch differential movement. The use of opposite handed threads thus provides an increased differential movement relative to the use of simple different thread pitches in the inner and outer threaded connector of the adjustment assembly. Adjusting the range of control to be built into the structure by using a simple pitch differential and/or pitch adder/subtractor would be possible with the use of a single threaded value. In this aspect, the movement for any given rotation of the connecting threaded element can be designed for different application requirements.

The present invention thus provides a connecting assembly or system permitting direct linear adjustment tailored to specific applications in a relatively simple, straightforward adjustment control. The incremental control is usually controlled by the selection of the threads relative to each other, both as to pitch and the direction threaded, and with the desired degree of fine and rather course adjustment readily provided thereby. Further, the preferred system will lock the motor unit in place preventing any undesired movement in either direction.

The connecting threaded member or element can, of course, include any suitable means for rotation and adjustment thereof to position the cylinder or other motor accurately as needed. The locking device can be placed on either side of the assembly as long as it provides for the necessary movement of the connecting threaded member. Any other system may be provided which prevents undesired movement of the threaded assembly after the final setting of the position of the threaded actuator unit.

As disclosed, the system can be applied to other threaded actuators having other motors other than a cylinder unit and where the threaded actuator is to be accurately positioned and locked in place.

The prior art has also used preloading of the threaded actuator which is of substantial significance in applications such as molding. The preloading and stop location is of significant importance in connection with a high quality side action system and apparatus. Normally, there would be a part which must be accurately located within the mold to define a precise part. The first slide element is located precisely in an alignment position. The other slides are then inserted. It is important that they do not "crash" into the reference slide to maintain the quality of the mold. Preloading has been successfully provided by interaction between the slide structure and the base structure of the mold The prior mold systems which incorporate the preloading of the actuator require onsite assembly and adjustment of the motor unit to establish a desired preload force on the actuator extendible member. Although highly satisfactory results have been obtained with the prior system, the set up time is increased and can require careful attention. The differential adjustment system as disclosed permits accurate setting of the position and preload, and is a particular advance in the technology of high intensity molding and die casting. In accordance with a further teaching, the system of this invention, as well as the prior art structure and systems, can be provided with an internal rod loading system within the structure of the threaded actuator and motor power unit.

In this aspect of the invention, a sleeve member is coupled to the rod and forms a stop member which engages a stop member on the motor unit, rather than a stop member on the mold unit or tool as such. The outer stop is a "limiting device" forming an integrated part of the motor unit itself. The load can be factory set and the stop on the mold itself eliminated. This provides for very accurate and repeatable preload positioning of the actuator.

The illustrated embodiment which is typical of a die cast machine discloses a particular mold apparatus and system. The present invention may of course be applied to injection molding systems or any other mold system accurately positioning a movable member of mold, which is to be accurately positioned and supports for establishing a proper mold cavity and withstanding the intense loan on the mold member during the molding process. As used herein, mold apparatus, mold components and the like is generic to all systems having a high load created on a positioned part during a molding process.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DESCRIPTION OF ILLUSTRATED EMBODIMENT

Figure 1:
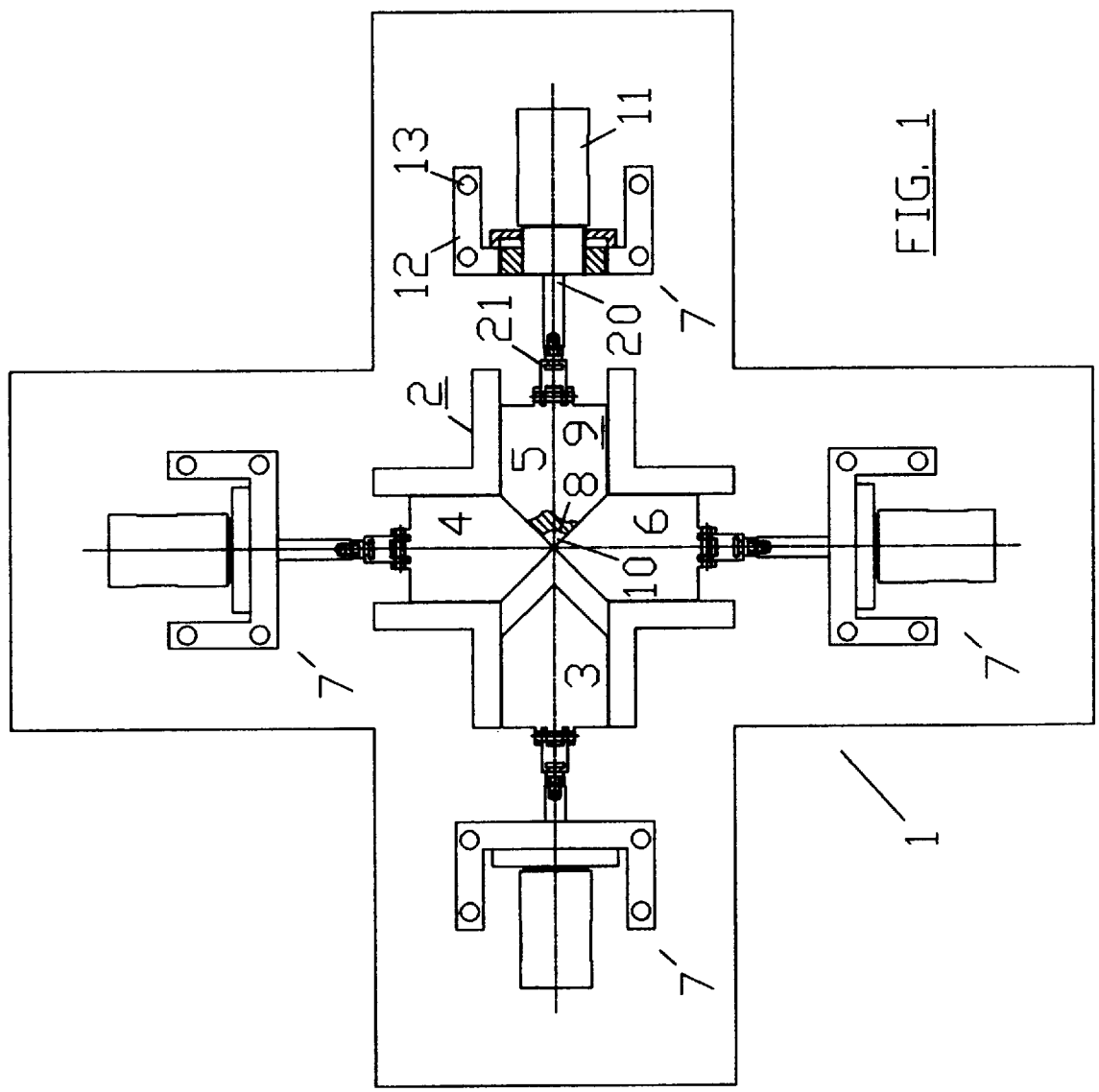
FIG. 1 is a simplified illustration of a die casting apparatus included a side action system for locating of four cores to form a mold cavity.
Figure 2:
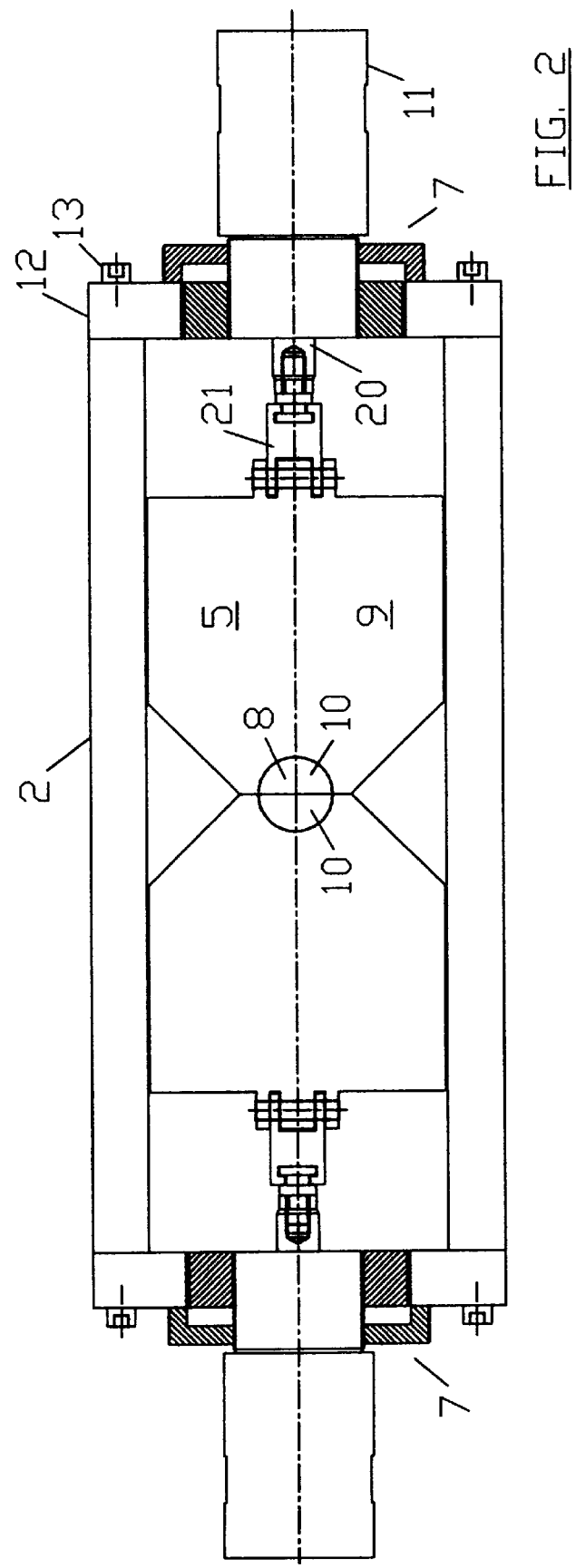
FIG. 2 is a simplified vertical section of one of the core slide arrangements, taken generally on line 2—2 of FIG. 1.

FIG. 1 is a plan view of a die casting apparatus illustrating an embodiment of the present invention. The apparatus includes a die casting mold 1 having an outer mold base 2. A cross-type opening is formed within the mold forming four slide-ways. Corresponding cores 3–6 are slidably mounted in the respective slide-way openings. Each is shown connected to similar threaded actuator unit 7 specially constructed as more fully described hereafter in accordance with a preferred embodiment of the present invention in order to precisely locate each of the cores 3–6 relative to each other. In the illustrated embodiment the inner location of the cores as shown in FIGS. 1 and 2 define a closed opening or cavity 8 defining the shape of a molded part. Each core 3–6 is shown as a substantial solid body 9, such as a square, cylinder or other shaped member. In the drawings, each core includes an innermost tapered end including a closed cavity opening 10 which, when combined with corresponding other cores, forms the central cavity 8. connected to an injection input, not shown. A very accurate positioning of the cores 3 through 6 relative to each other is desired. The above illustrated system is one typical mold which permit describing of a preferred one embodiment of the present invention, but is not a limiting factor to the use of the present invention in other applications including other molding systems.

Each of the actuator units 7 is similarly constructed as more fully shown in FIGS. 2–5a. Referring to FIGS. 2–5, the actuator unit includes a hydraulic cylinder unit 11 which is shown of a presently known construction. It is connected to and within a mounting flange 12 forming a fixed support structure. A plurality of bolts 13 secure the flange 12 to the end of the mold base or housing 2 and provide a rigid and fixed securement of the hydraulic cylinder unit as an integrated part of the mold base 2. The hydraulic cylinder 11 unit includes a cylinder 14 of a generally known construction having a threaded nose 15. The threaded nose heretofore has been directly threaded into a correspondingly threaded opening in the mounting flange 12. In the present invention, however, an adjustable differential threaded connection unit 16 interconnects the threaded nose 15 to a threaded portion 17 of the mounting flange 12 as more fully developed hereinafter. The cylinder unit includes an inner piston 19 connected to a piston rod 20 which projects outwardly of the cylinder 14 to the core slide. A releasable coupling 21 connects the outer end of the rod to the core 5. Coupling 21 provides for precise alignment between the core and the rod 20 for transmitting of the force on the rod to the core 5. The illustrated connection of the rod includes an essential in-line coupling unit. Other couplings may be provided within the teaching of this invention such as a toggle assembly or other units which transfer the mold injection loads to the actuator.

The cylinder 14 includes the usual connection to hydraulic lines 22 for moving the piston on extend 22a and retract 22b and thereby the piston rod and interconnected core slide. In accordance with standard practice high force loading of the hydraulic cylinder unit 11 is created by forcing the core slide into engagement with a stop 22c in the core slide, or against an opposing core slide in the final assembly. In practical construction depending upon the different size units provided, the preloading force may typically be anywhere from 12,000 to 210,000 pounds and other various constructions and specifications may require meeting a substantially higher load than the above. Forces or loads can readily be multiples of the above loads in considering present designs. Once the desired preloaded position is established, a locking mechanism 23 within the cylinder unit 11 is interconnected between the cylinder and the rod to positively lock the rod in the extended position and providing a rigid preloaded support for the core and rod within the desired location. The heavy preloading precompresses the rod assembly including any compression of the material component within the rod and cylinder, as well as the core and other interconnected components. Although most products are formed of a very rigid material which are generally referred as being incompressible, in fact the members may have small but significant compression under the very heavy loads encountered in molding and particularly die casting and the like. The preloading maintains a precise location responsive to the heavy injection pressures and loading created during the forming of products within the cavity 8.

In the illustrated embodiment of the invention, the locking mechanism 23 is located at the rod end of the cylinder 14 and includes a known hydraulically actuated system. In the cylinder 14, a hydraulically located locking piston 24 is slideably mounted on the rod between the exit end of the cylinder unit and the piston 19. The locking piston 24 includes an inner tapered surface portion 25 facing rearwardly toward the cylinder piston. Lock segments 26 encircle the rod and are located in alignment with a groove 27 in the rod. With the locking piston 24 located in spaced relation or toward the rod exit end of the cylinder unit, the segments 26 are free to move out of the rod groove 27. As the rod is moved to the positive end position, hydraulic pressure is applied as at 22a to move the locking piston and positively force the segments into the groove 27 and positively lock the piston rod against subsequent movement. As the segments 26 are squeezed, the rod 20 is forced forwardly ensuring a positive seat on the core face. Simultaneously a locking sensor 28 may be actuated. Retract fluid applied to the locking piston at the port 22b results in releasing of the locked rod slide and allowing of the segments to disengage as the piston retracts. When fully retracted the rear sensor 28a may be activated indicating the slide is fully retracted.

With this type of a loading and in many other applications, precise location of the rod or other extendible member is desired. In the prior system, the location was established by the threaded location of the cylinder unit.

In accordance with the present invention, the precise location is promoted and entirely effectively produced as a result of the differential threaded connection unit 16 by interconnecting of the threaded cylinder to the mounting flange 12 and thereby to the base or housing 2.

Returning particularly to FIGS. 4, 5 and 5a, a preferred embodiment of unit 16 is more clearly illustrated. The differential threaded connection includes the threaded nose 15 of cylinder 14 located within a threaded opening 30 in the mounting flange 12. The nose 15 and opening 30 are in spaced concentric orientation and location. A threaded adjustment member 31 is threaded into the threaded opening 30 and onto the threaded nose 15. The threads 32 of member 31 and threads 33 of the flange threaded opening 30 are of one pitch and/or handedness construction while the threads 34 of the nose 15 and the threads 35 of the member 31 are of a different pitch and/or handedness construction. Rotation of the threaded adjustment member 31 results in a linear movement of the cylinder unit 11 and thereby the extendible cylinder rod 20 with the different pitches and/or handedness construction. With the flange 12 fixedly attached to the mold base, a fixed support structure is established. Rotation of the adjustment member 31 results in a related differential cylinder unit movement. A linear movement of the cylinder unit 11 and thereby rod is directly related to the thread differences between the two matching threaded portions of the threaded opening 30 and the threaded nose 15.

The threaded element may be provided with any means for rotating of the same. For example, as shown notches 35a within the face of the element may be provided for engagement with a suitable tool for rotating of the member 31 and thereby providing a desired adjustment movement of the cylinder unit and locked piston rod.

Figure 3:
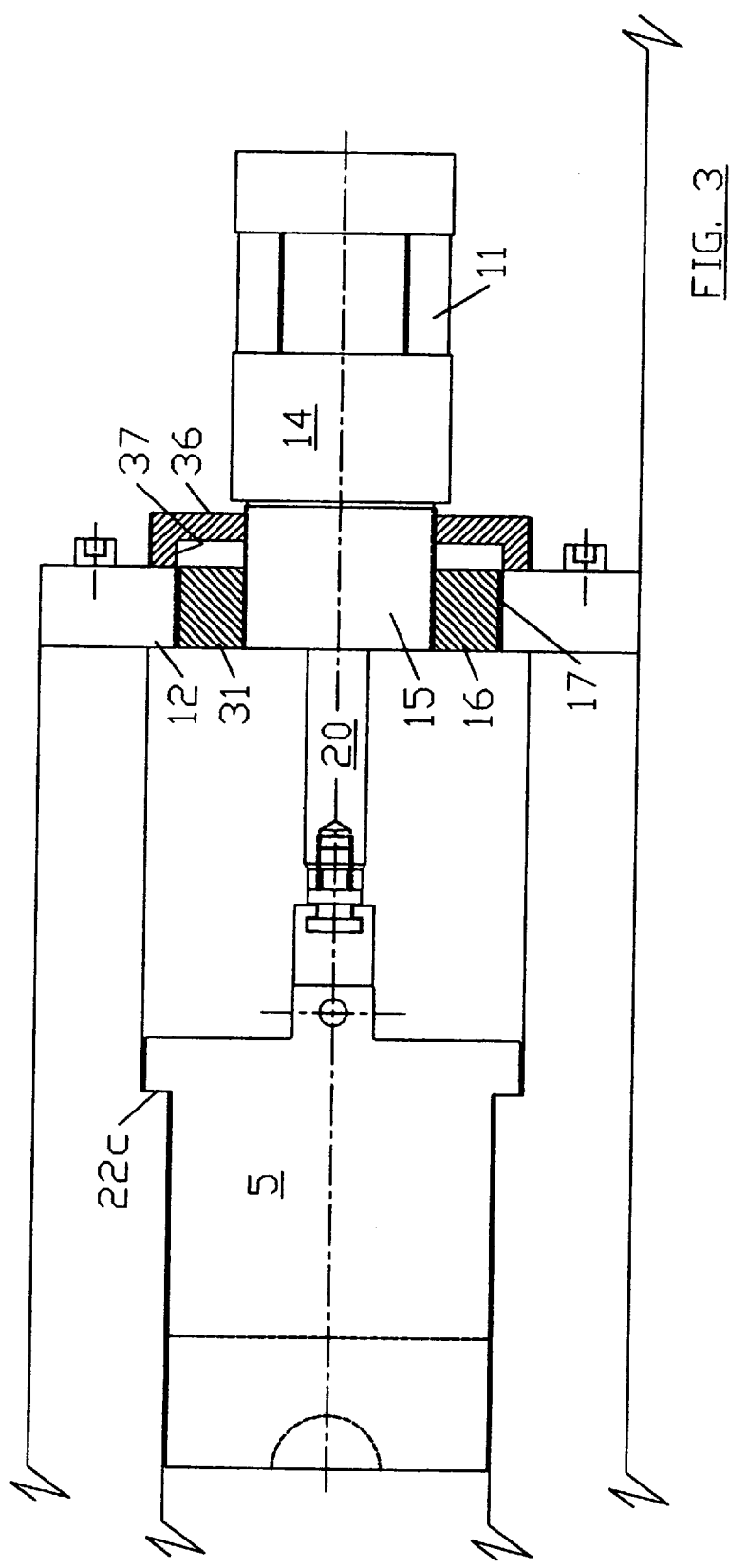
FIG. 3 is an enlarged view of a core end and a threaded actuator including a differential threaded assembly for positioning of the core in the closed and open position.
Figure 4:
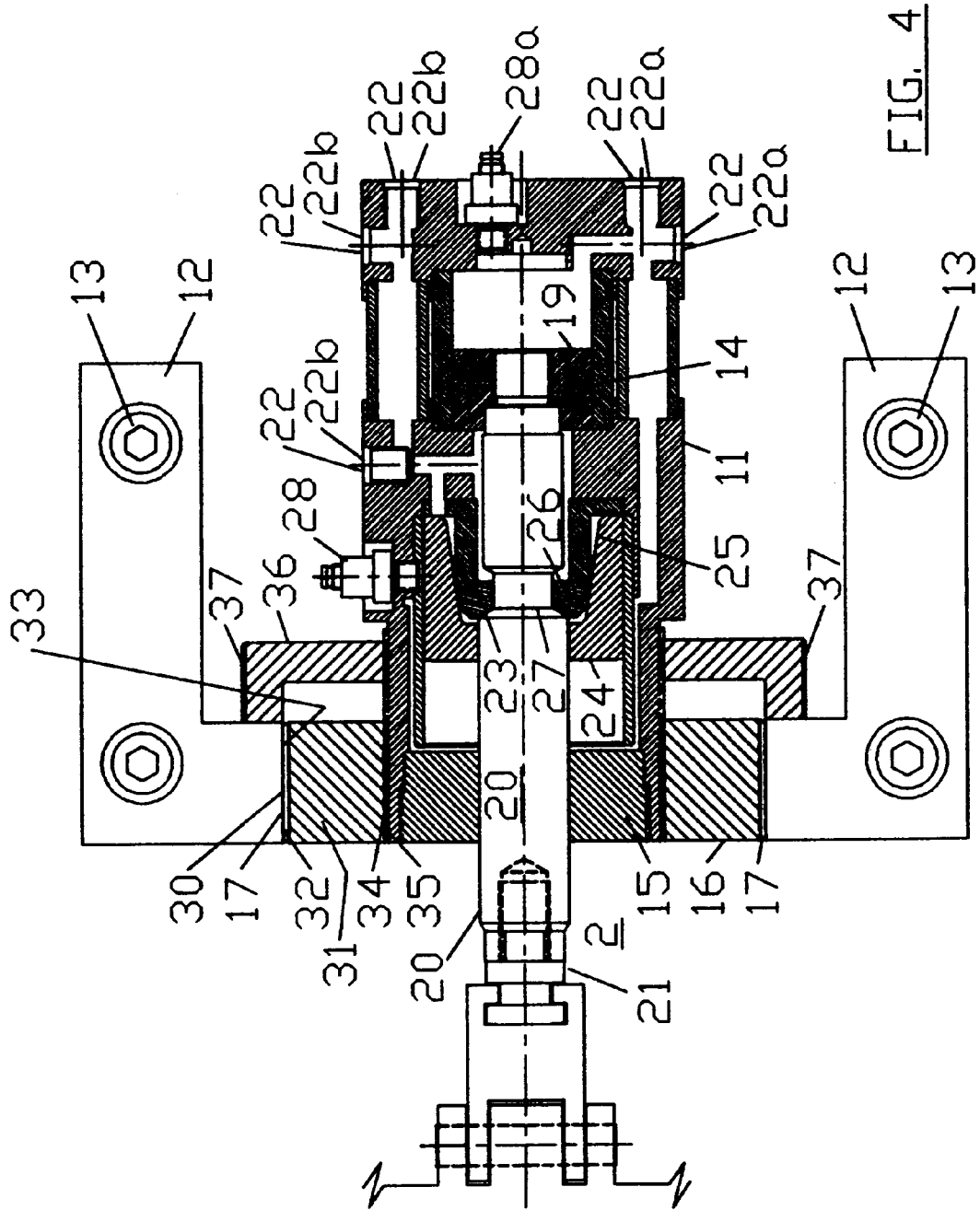
FIG. 4 is a side view of FIG. 3
Figure 5:
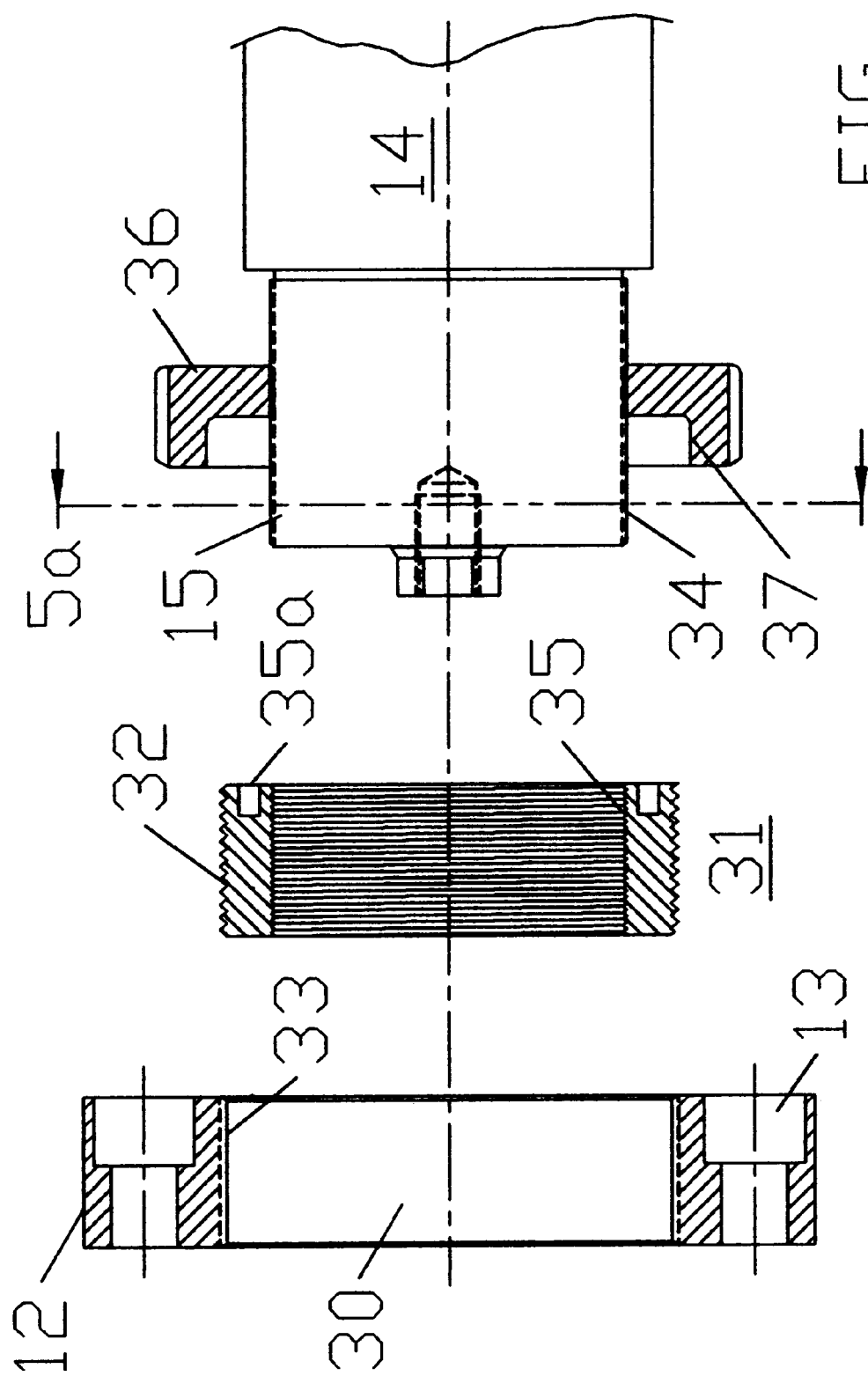
FIG. 5 is an exploded view of the threaded actuator.
Figure 5A:
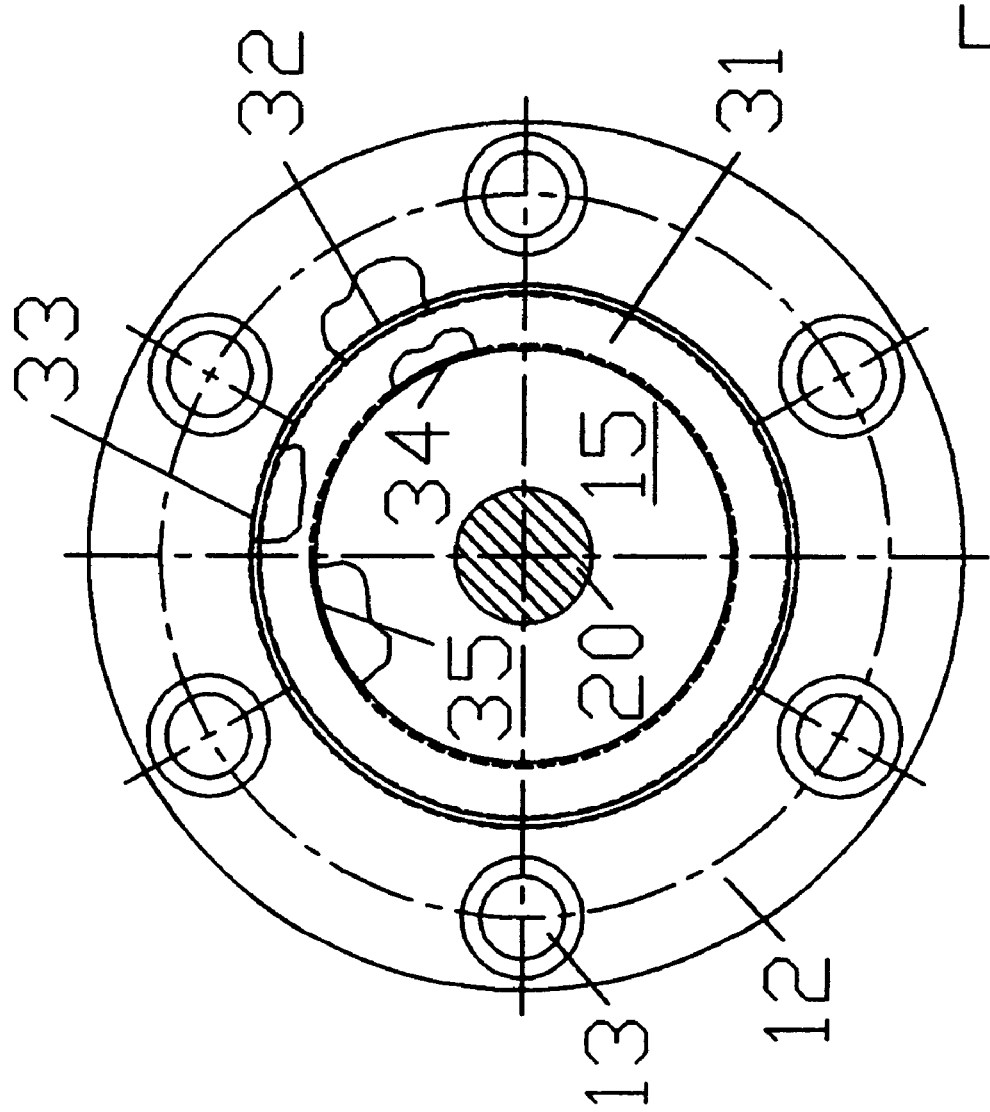
FIG. 5a is a view taken generally on line 5a–5 of FIG. 5.

After the adjustment is made, a securement unit, shown as a flanged jam nut 36, device which is threaded onto the cylinder nose 15, between the adjustment portion and the operating cylinder 14 is threaded into locking engagement with the mounting flange 12, as shown in FIGS. 3 and 4. This provides for locking of the assembly into the adjusted position and provides for very firm, reliable locking of the assembly in the desired preloaded position.

Any other locking system may be used. For example, one alternative could use a split nut as the connecting member of the differential member. The illustrated securing device is shown as generally channel-shaped member with outer lip 37 engaging the flange 12. This structure provides for the inward movement of the adjustment member 31 into the jam nut throughout a necessary full range of adjustment.

The adjustment member 31 also has sufficient axial length to allow the partial outward movement of the flange 12 while maintaining an effective engagement and positioning of the hydraulic cylinder unit 11 for supporting the unit in the desired locked position.

The differential between the spaced threaded connections determines the amount of shift per revolution of the adjustment member 31. In this aspect of the invention, however, the adjustment can also be constructed and interrelated by having the threads of the same handed direction or by having one of the right-hand threads and the other of the left-hand threads. Thus, by making the different thread relationships, a further course adjustment can be incorporated into the position control system.

Generally, those familiar with threaded connection will recognize that for the system as illustrated, like handed threaded connections can be defined by the following equation:

$$\frac{1}{\text{outerpitch}} - \frac{1}{\text{innerpitch}} = \Delta/Rev.$$

Further, in this movement, the actuator being a movable member, will follow the movement of the adjustment member. If the pitch of the inner and outer threaded connections are identical, there is zero movement per revolution of the adjustment member. As a result, the actuator stays stationary and the adjusting member merely moves through the connection between the actuator and the flange. This is the only non-functional system.

If the threaded connections have different pitches, the movement is in the direction of the larger or smaller threads depending up the relative location therebetween. Thus, if the outer threaded connection has a large pitch, the adjusting member and the interconnected actuator will move in the direction of the movement of the adjustment member within the flange. Conversely, if the outer threaded connection has a smaller pitch, the movement of the actuator will be in the opposite direction with respect to the adjustment member. Thus, the various combinations will provide various forms and degrees of movement.

If the threaded connections have an opposite handed threads, the equation then becomes the additive and is set forth as:

$$\frac{1}{\text{outerpitch}} + \frac{1}{\text{innerpitch}} = \Delta/Rev.$$

The additive motion again is such that the actuator follows the direction of the adjusting member.

For all combinations of pitch and handedness of except like-pitches and like handed connection; the actuator can be adjusted relative to the support structure.

In connection with the adjustment system, the relative movement of the motor unit with respect to a fixed support is therefore dependent upon both the relative pitch of the outer thread connection and the inner thread connection, singly or in combination with the handedness of the threads, with the exception of the one state which results in zero movement of the actuator. Thus, the handedness of thread connections can provide for a differential movement and in addition, when combined with different pitches can increase the degree of movement per revolutions.

As an example, it is assumed that the outer thread has a diameter of eight inches and the inner thread has a diameter of six inches. The annular connecting member would then have a radial thickness of one inch. The connecting member would of course always have the same inner mating threads meshing with the motor and outer threads meshing with the support structure. With an eight pitch outer support thread and a twelve pitch inner motor thread, each revolution of the connecting member would result in movement as follows. The outer right hand thread would contribute 0.125 inches per revolution. The twelve pitch inner thread would contribute 0.0832 inches per revolution. If the threads are of the same handedness, that is, either both right hand or left hand threads, the movement will be equal to the difference in the thread relative movement, namely, 0.125 minus 0.0832 or equal to 0.0418 inches per revolution. The direction of the actuator would be opposite that of the adjusting member because of the larger outer threaded connection. If the threads are opposite handed threads, such as one a right hand thread and the other a left hand thread, the movements are additive and the motor unit will be moved a greater distance. Generally, with the above arrangement, each revolution of the connecting member will create movement in the same direction as the connecting member equal to one (1) over the outer pitch plus one (1) over the inner pitch. In the immediate above example, the movement will be a total movement of 0.125 plus 0.08327 equals 0.2038 inches per revolutions. With the opposite handedness, the actuator follows the adjusting member and moves in the same direction.

If the pitch is identical, (for example, if both had a pitch of 8 providing 0.125 inches per revolution of movement), and both had the same handedness, the above definition or equation would result in the shift being equal to zero and a combination which does not produce the desired result.

In conventional practice, threads are assumed to be right-handed thread absent special designation. Adding LH after the pitch number identifies a left hand pitch in contrast to a right hand pitch.

In summary, various combinations of different inner and outer pitch arrangement relationships alone or and more fully in combination with right and left-handed threads on the respective coupling provide a very wide range and relatively fine control of the rod position per revolution of the adjustment element. All of this is without any rotation of the cylinder unit or other components of the motor system. It thus provides for a very simple but accurate alignment and control of the system positioning.

As used in the present application, the reference to a mold apparatus and/or a mold is generically defining the mold structure of a die cast machine, injection molding apparatus and other similar forming systems. In particular, mold apparatus includes one or more movable components which must be properly positioned in order to produce high quality parts.

As previously noted, although disclosed in a particular unique application the same concept can, of course, be applied to other powered threaded actuators where the actuator has a threaded mounting for locating the same but the final position should be created without rotation of the actuator with respect to the mounting system.

The differential adjustment system of the present invention is particularly significant in the positioning of an extendible elongated member of rigid material which is classified as a non-compressible material or substantially incompressible, such as a known steel which is subjected to large, intense force and load. The adjustment system may, however, be otherwise applied wherein a final and/or fine adjustment is required of an element or structure to support an intense load.

The hydraulically operated motor system is a practical application of the present invention. The motor system may, within the teaching therein, include other motive sources including pneumatic, electrical or mechanical drive members for the positioning of a rigid positioned member.

The present invention in its broadest aspects provides for adjustment between a motor unit having an elongated output member extended outwardly and a support for said motor unit with an encircling differential threaded connection unit therebetween for relatively moving the motor unit to accurately position the extension of the output member. The combination provides for adjustment over a wide range of position of the element with a relatively course or large movement per revolution through the concept of the pitch adder and a finer control per revolution relying solely on the pitch differential with the same handedness threads. This provides for the adjustment of the linear actuator over a relatively wide range without relative rotation between the support and the actuator as such. This is obviously a significantly factor where the linear member is subjective to very intense loads and the system should maintain a relatively precise position in the presence of intense loads.

The present invention can be applied to existing mold apparatus; for example, to die casting machine designs which often use a toggle linkage connected to the mold or mold base of the machine and the slide-way for positioning of the core. The present invention is thus applicable to any mold system in which the forces created during the molding process are transferred and applied to a threaded actuator. In conventional plastic molding and the like, a similar mechanism is required to locate pins and core structure to form an injection mold cavity inside the mold base in contrast to the die cast machines having a slide-way to form a die cast cavity. Thus, generally, with the recognition of the characteristic of even rigid steel members having an inherent degree of some compressibility under intense loads, a single set position may not always establish the same proper positioning or have the proper preload position under all conditions. The systems for optimal operation require some fine adjustment to reposition the mechanism to the correct position, and also permit establishing the necessary and desired preload performance.

Further as previously discussed and as shown in the first embodiment, preloading of the actuator against the base structure of the molding apparatus. includes on-site preloading and thus adjustment of the motor unit.

It would be highly desirable to provide for factory preloading to avoid on-site preloading of the mechanism and require only the precise slide location.

A further improvement in the system previously described includes internal preloading of the actuator slide positioning at the factory or other location prior to assembly to the mold supports.

Figure 6:
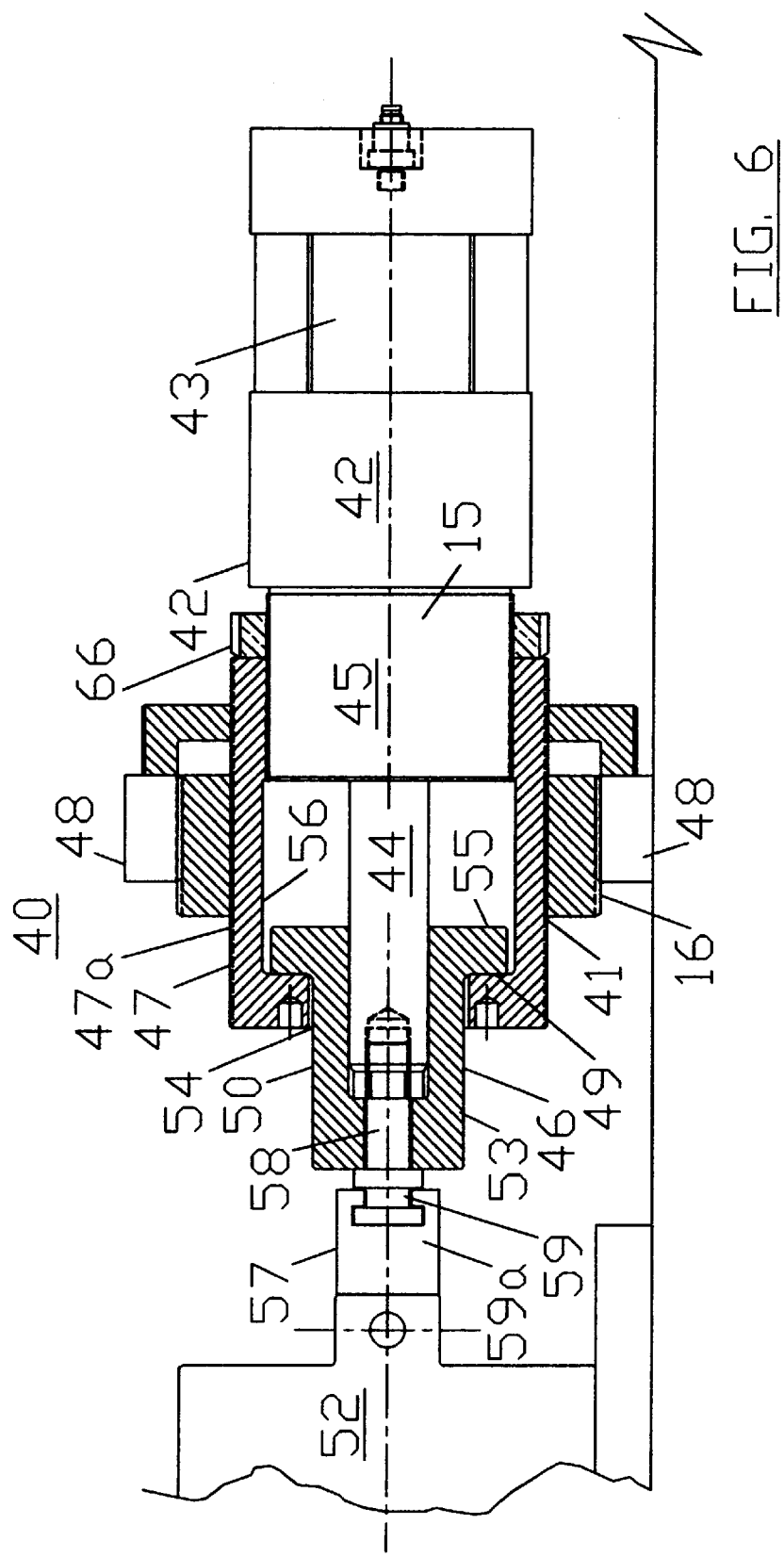
FIG. 6 is a view similar to FIG. 3 with the addition of a preload stop structure incorporated into the threaded actuator in combination with the differential adjustment mechanism.
Figure 7:
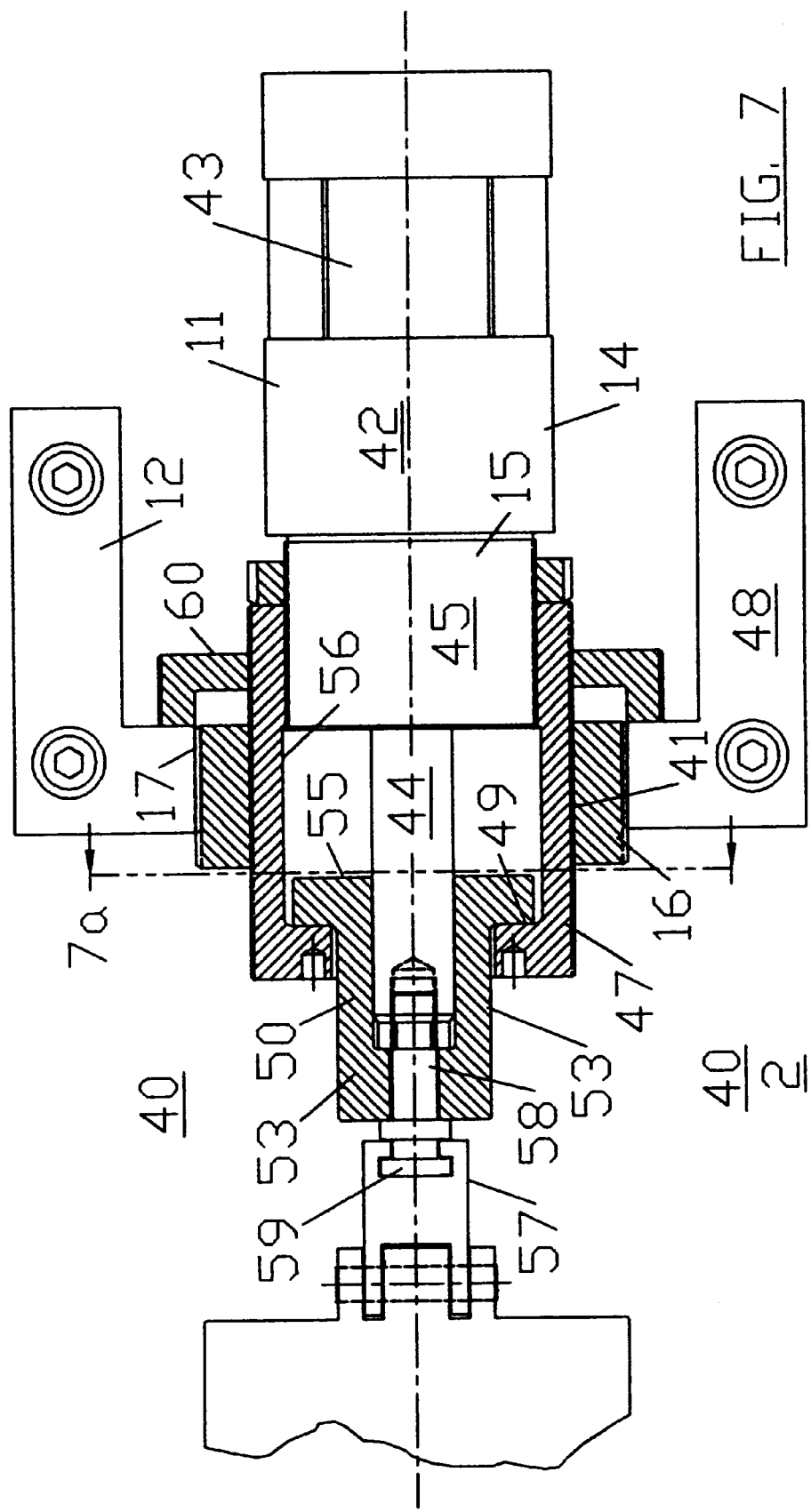
FIG. 7 is a side view of FIG. 6.

A modified construction is illustrated in FIGS. 6 and 7 with a preload incorporated directly into the threaded actuator to permit preloading of the positioning mechanism independent of the mold apparatus and the core slide.

Figure 7A:
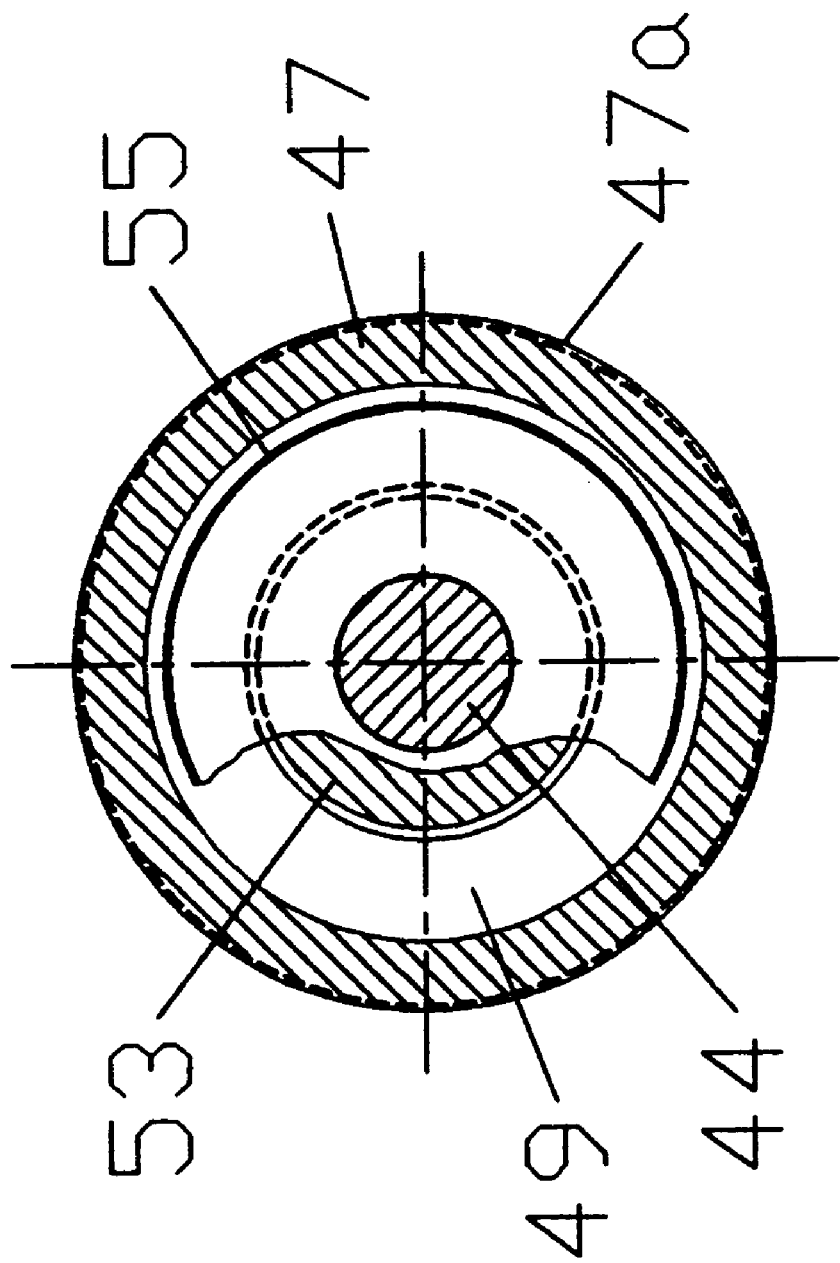
FIG. 7a is an end view taken generally on line 7a–7a of FIG. 7.

Referring particularly to FIG. 6, the actuator 40 is illustrated with differential mounting or adjustment assembly 41 corresponding to that of FIGS. 1–5. A cylinder unit 42 also incorporates a cylinder 43 and piston rod 44 and further a rod locking system 45 as in the first embodiments. In the preloaded actuator 40, a stop assembly or unit 46 is shown incorporated in and forms an integrated part of the cylinder unit 42. Generally, the preload unit 46 includes a cylinder sleeve 47 secured to the cylinder nose of the cylinder 42 with the securing nut 72a and preferably forming an integral assembly to cylinder locking system 45. The outer surface of the cylinder sleeve 47 is threaded as at 47a and forms the one differential threaded connection of differential adjustment system 41 to the base or support structure 48. The outer end of the cylinder sleeve 47 includes an inward extended stop wall 49. In the illustrated embodiment, the stop wall 49 is shown as a continuous circular wall, as shown in FIGS. 7a.

The preload unit 46 further includes a stop wall member 50 securely affixed to and forming a rigid part of the piston rod 44. The stop wall member 50 includes a tubular body portion 53 having a diameter slightly less than the opening 54 of the cylinder stop wall 49 of the sleeve 47 and an outward extended rod stop wall 55 at the inner end within the cylinder sleeve 47. The rod stop wall 55 is also shown as a solid circular wall having a diameter slightly less than the inner diameter 56 of the sleeve 47. The outward extension of the piston rod 44 engages the rod stop wall 55 with the cylinder stop wall 49 prior to the full extension of cylinder 43 and the piston rod 44. The power cylinder unit 42 is actuated to increase the load on the piston rod and the interengaged stop walls 49, and 55 to preload the piston rod 44 and locking assembly. This establishes a "factory" set preload of the actuator 40 which can be tailored to known mold load. The actuator 40 can be tailored to a known mold load or other loads in other applications. The actuator can therefore be directly and rapidly assembled in the field to the mold apparatus. This provides a more reliable and cost effective mold apparatus and system.

The secure connection of the stop wall 50 to the rod end of rod 44 may be provided in any desired fixed or replaceable connection. A modified rod end coupling is shown in FIGS. 6 and 7. The coupling 57 includes a connecting bolt 58 with slotted end 59 mating a mating projection 59a on the core slide 52. The bolt 58 extends through an opening in member 53 and is fixedly secured by threading into the rod 44 securing the assembly.

In the field installation, the hydraulic actuator is secured to the base mounting frame 48 with the securement nut 60 for the differential adjustment unit in a released position of the attached slide core 52. The securement nut 60 moves to lock the actuator and particularly to lock the preloaded and positioned rod with core slide 52 in the best position for forming of parts.

The rigid and integrated attachment of the rod stop member to the piston rod may be of any desired construction which insures the compressive preloading of the piston rod.

Figure 8:
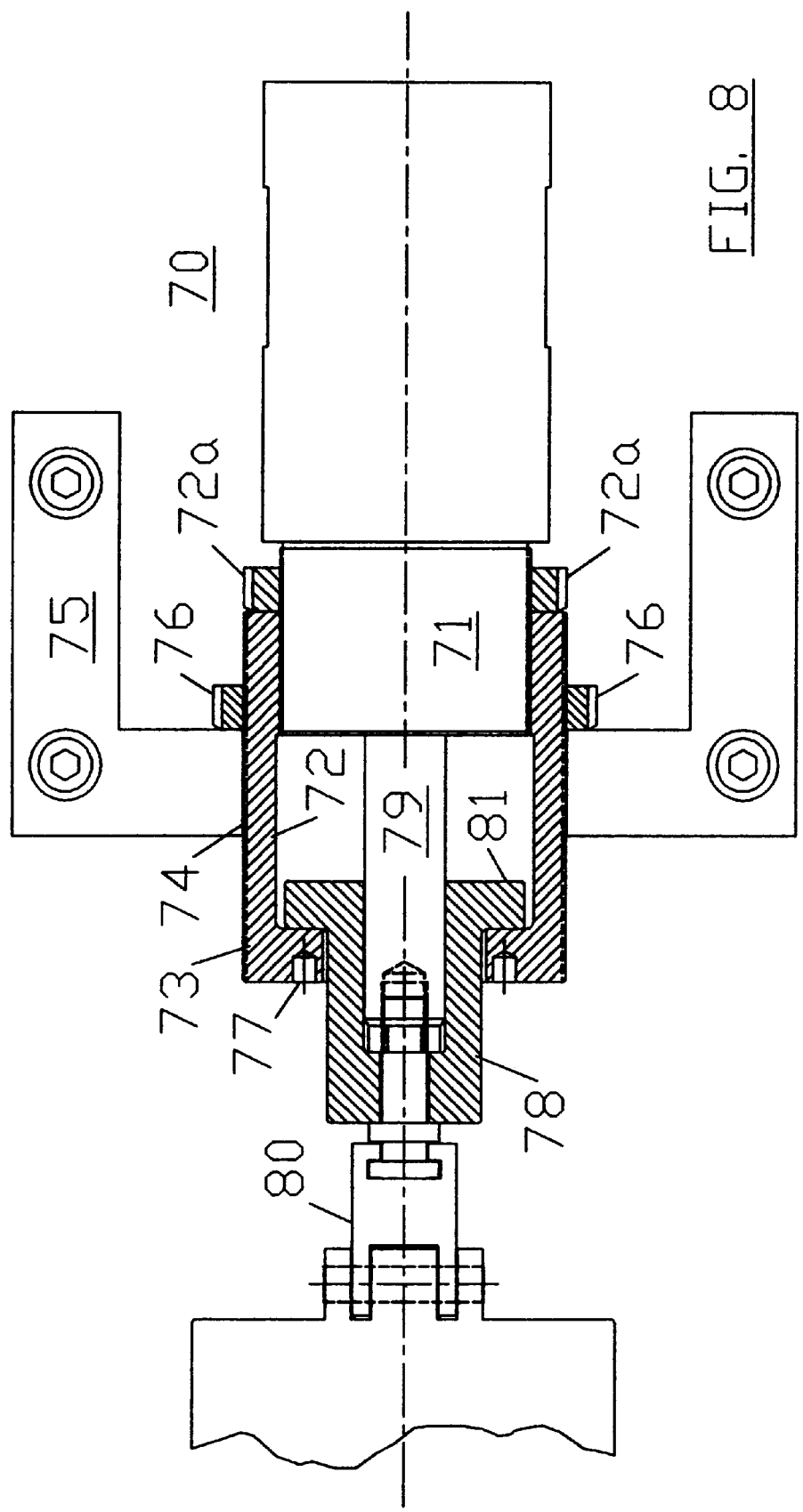
FIG. 8 is a top view of an actuator with a stop structure without a threaded differential adjustment of FIGS. 1–7.

In a further aspect of this disclosures, the preload stop assembly may be applied to a prior art actuator without the fine adjustment assembly, as shown in FIG. 8.

In embodiment of FIG. 8, the hydraulically operated cylinder actuator 70 includes nose 71 secured within the outer end of a sleeve 72 with a jam nut 72a locking the sleeve to the nose and thereby cylinder unit. The sleeve 73 has an outer thread 74 and is threaded into a support frame or structure 75 for securement to a mold, not shown. A jam nut 76 secures the cylinder in place.

The sleeve 73 is constructed as in the embodiment of FIGS. 6 and 7 to form a stop wall 77. A rod stop unit 78 is secured to the piston rod 79, by the core coupler 80 as in the first embodiment. The stop unit 78 includes a stop wall 81 which engages the sleeve stop wall 77 prior to full extension of piston rod 79, as in the previous embodiment. The preload system of FIG. 8 functions as in the embodiment of FIGS. 6 and 7 to preload the locked piston rod 79 and establish a similar factory adjustable and lock preload of the actuator.

Although the sleeve is shown as a separate member, the sleeve could be formed as an integral part and extension of the nose or cylinder as such.

The illustrated integrated stop wall system may include any other combination of stop elements secured to the rigid movable work member and to the unit or the mounting element for connecting or connected to the base structure.

Various alternatives and embodiments are contemplated as being within the scope of the following claims particularly pointing out and distinctly claiming the subject matter regarded as the invention.

I claim:

1. A molding apparatus for forming of parts comprising a mold having at least one core mounted in an opening in the mold, said core defining at least one wall portion of a forming cavity, a threaded cylinder actuator connected to said core and comprising a cylinder and a piston rod, said cylinder having an outer threaded portion, said mold including a support structure having a threaded opening larger than said outer threaded portion, said outer threaded portion being located within said threaded opening, and an adjusting threaded member interposed between said threaded opening and said outer threaded portion and having an inner threaded connection with said outer threaded portion and an outer threaded connection with said threaded opening, said adjusting inner threaded connection and said outer threaded connection being configured to form a differential threaded connection of said cylinder actuator and said support structure for fine adjustment of the position of said cylinder actuator and thereby said rod relative to said forming cavity.

2. The molding apparatus of claim 1 wherein said inner and outer threaded connection are of a different pitch.

3. The molding apparatus of claim 2 wherein said inner and outer threaded connections included like handed threads.

4. The molding apparatus of claim 2 wherein said inner and outer threaded connections are opposite handed threads.

5. The molding apparatus of claim 1 wherein said inner and said outer threaded connections are opposite handed threads.

6. The molding apparatus of claim 1 including a base unit, said support structure is secured to said base unit, and said actuator is secured to said support structure.

7. The apparatus of claim 1 wherein said cylinder is a hydraulic cylinder unit, and including a locking system comprising a lock cylinder connected to said hydraulic cylinder unit with said piston rod passing therethrough, and said locking system includes a hydraulic operated clamp assembly releasably coupled to said rod within said cylinder.

8. The molding apparatus of claim 1 wherein said cylinder actuator includes a preload stop wall connected to said cylinder and located adjacent the path of said piston rod, a stop member secured to said piston rod aligned with said preload stop wall and engaging said outer stop wall and thereby defining the outer limit of said piston rod and preloading of said piston rod in accordance with the operation of the cylinder, and a locking system coupled to said piston rod to lock said rod in said preloaded position with said core in place for molding.

9. The molding apparatus of claim 8 wherein said inner and outer threaded connections are of a different pitch.

10. The molding apparatus of claim 9 wherein said inner and outer threaded connections include like handed threads.

11. The molding apparatus of claim 9 wherein said inner and outer threaded connections are opposite handed threads.

12. The molding apparatus of claim 8 wherein said inner and said outer threaded connections are opposite handed threads.

13. The molding apparatus of claim 8 including a base unit, said support structure is secured to said base unit, and said actuator is secured to said support structure.

14. The apparatus of claim 8 wherein said cylinder is a hydraulic cylinder unit, and including a locking system comprising a lock cylinder connected to said hydraulic cylinder unit with said piston rod passing therethrough, and said locking system includes a hydraulic operated clamp assembly releasably coupled to said rod within said cylinder.

15. The molding apparatus of claim 8 wherein said cylinder unit is a hydraulic cylinder unit.

16. A mold part positioning apparatus comprising an elongated rod member configured for connection to a mold core and having an axis, a motor unit connected to said rod member for axial movement of the rod movement, said motor unit having an outer threaded portion including a common axis with the rod member, a mounting structure for supporting said motor unit and including a motor opening having an inner threaded portion with a common axis with said rod member, an annular connecting member threaded into the opening with an outer threaded connection to said mounting structure and with an inner threaded connection to said motor unit, said outer threaded connection and said inner threaded connection having different threaded configurations for relative positioning of said motor unit and said mounting structure.

17. The mold part positioning apparatus of claim 16 wherein said different thread configurations include different pitch threads or different handed threads.

18. The mold part positioning apparatus of claim 16 wherein said different thread configuration includes different handed threads and like pitch threads.

19. A mold position actuator for a molding apparatus having a mold body including at least one part moved between a mold open position and a mold closed position, said mold positioning actuator comprising a rigid position member configured for positioning connection to said part and operable for moving the part between said open position and said closed position, a motor unit connected to and supporting said rigid positioning member for said movement, a support structure supporting said motor unit with said rigid positioning member, said support structure including a tubular member secured to said motor unit and having an outer threaded wall portion having an extended threaded portion, a threaded collar having an internal thread matching said outer threaded wall portion threaded onto said tubular member, said collar having an external thread, said support structure having a fixed support with a threaded opening, said collar threaded within said threaded opening, the threaded connection between the collar and the motor unit having a different pitch than the threaded connection between the collar and said tubular member.

* * * * *